(12) United States Patent
Kodera et al.

(10) Patent No.: US 9,429,885 B2
(45) Date of Patent: Aug. 30, 2016

(54) LIGHT IRRADIATION DEVICE, FIXING DEVICE, AND IMAGE FORMING APPARATUS

(71) Applicant: FUJI XEROX CO., LTD., Tokyo (JP)

(72) Inventors: Tetsuro Kodera, Kanagawa (JP); Takashi Matsubara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/619,650

(22) Filed: Feb. 11, 2015

(65) Prior Publication Data
US 2016/0062282 A1 Mar. 3, 2016

(30) Foreign Application Priority Data
Aug. 27, 2014 (JP) ................................ 2014-173117

(51) Int. Cl.
G03G 21/04 (2006.01)
G03G 15/20 (2006.01)
H04N 1/00 (2006.01)

(52) U.S. Cl.
CPC ........ *G03G 15/2007* (2013.01); *G03G 21/046* (2013.01); *H04N 1/00843* (2013.01); *H04N 1/00846* (2013.01); *H04N 1/00875* (2013.01)

(58) Field of Classification Search
CPC .................................................. G03G 21/046
USPC ........................................................ 399/366
See application file for complete search history.

(56) References Cited

U.S. PATENT DOCUMENTS

| | | | | |
|---|---|---|---|---|
| 8,249,493 B2* | 8/2012 | Matsubara | ......... | G03G 15/2007 399/336 |
| 8,452,220 B2* | 5/2013 | Kagawa | ............ | G03G 15/2007 399/122 |
| 8,577,272 B2* | 11/2013 | Matsubara | ........... | G03G 15/201 399/336 |
| 8,606,166 B2* | 12/2013 | Maeda | ................. | G03G 15/201 399/337 |
| 8,718,527 B2* | 5/2014 | Kageyama | ........... | G03G 15/201 399/336 |
| 2003/0042430 A1 | 3/2003 | Tanaka et al. | | |
| 2004/0266223 A1 | 12/2004 | Tanaka et al. | | |

(Continued)

FOREIGN PATENT DOCUMENTS

JP 2007-043191 * 2/2007 ............. H01L 21/20
JP 2007-43191 A 2/2007

(Continued)

*Primary Examiner* — Clayton E Laballe
*Assistant Examiner* — Kevin Butler
(74) *Attorney, Agent, or Firm* — Sughrue Mion, PLLC

(57) ABSTRACT

Provided is a light irradiation device including plural first irradiation units that irradiate an irradiation target area on a surface to be irradiated with light beams and are disposed in a specific direction, and plural second irradiation units that irradiate an outside of the irradiation target area with light beams and are disposed at an outer side of the first irradiation units in the specific direction, wherein light beams emitted from two adjacent irradiation units among the plural first irradiation units and the plural second irradiation units are superimposed with each other in the specific direction, and a first irradiation width that is not superimposed with the light beam from the adjacent first irradiation unit is smaller than a second irradiation width that is not superimposed with the light beam from the other adjacent first irradiation unit.

20 Claims, 11 Drawing Sheets

(56) References Cited

U.S. PATENT DOCUMENTS

| | | | |
|---|---|---|---|
| 2011/0038653 A1* | 2/2011 | Egusa | G03G 15/201 399/336 |
| 2011/0044740 A1* | 2/2011 | Matsubara | G03G 15/2007 399/335 |
| 2011/0044741 A1* | 2/2011 | Matsubara | G03G 15/2007 399/335 |
| 2011/0058867 A1* | 3/2011 | Kodera | G03G 15/2007 399/335 |
| 2011/0064448 A1* | 3/2011 | Watanabe | G03G 15/2007 399/92 |
| 2011/0116851 A1* | 5/2011 | Tanaka | G03G 15/2007 399/336 |
| 2011/0158721 A1* | 6/2011 | Matsubara | G03G 15/2007 399/336 |
| 2012/0207500 A1* | 8/2012 | Kodera | G03G 15/2007 399/67 |
| 2012/0243893 A1* | 9/2012 | Egusa | G03G 15/201 399/67 |
| 2013/0071160 A1 | 3/2013 | Matsubara et al. | |
| 2013/0243502 A1* | 9/2013 | Egusa | G03G 15/2007 399/336 |
| 2014/0241765 A1* | 8/2014 | Kodera | G03G 15/201 399/329 |
| 2015/0093170 A1* | 4/2015 | Kodera | G03G 15/2007 399/336 |

FOREIGN PATENT DOCUMENTS

| | | | | |
|---|---|---|---|---|
| JP | 2011-076051 | * | 4/2011 | G03G 15/20 |
| JP | 2011-76051 A | | 4/2011 | |
| JP | 2013-064860 | * | 4/2013 | G03G 15/20 |
| JP | 2013-64860 A | | 4/2013 | |

* cited by examiner

LIGHT IRRADIATION DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2014-173117 filed Aug. 27, 2014.

BACKGROUND

Technical Field

The present invention relates to a light irradiation device, a fixing device, and an image forming apparatus.

SUMMARY

According to an aspect of the invention, there is provided a light irradiation device including:

plural first irradiation units that irradiate an irradiation target area on a surface to be irradiated with light beams and are disposed in a specific direction; and plural second irradiation units that irradiate an outside of the irradiation target area with light beams and are disposed at an outer side of the first irradiation units in the specific direction, wherein light beams emitted from two adjacent irradiation units among the plural first irradiation units and the plural second irradiation units are superimposed with each other in the specific direction, and a first irradiation width that is not superimposed with the light beam from the adjacent first irradiation unit among irradiation width of the surface to be irradiated that is irradiated with the light beam from the second irradiation unit in the specific direction is smaller than a second irradiation width that is not superimposed with the light beam from the other adjacent first irradiation unit among the irradiation width of the surface to be irradiated that is irradiated with the light beam from the adjacent first irradiation unit in the specific direction.

BRIEF DESCRIPTION OF THE DRAWINGS

Exemplary embodiments of the present invention will be described in detail based on the following figures, wherein.

Figure 3:
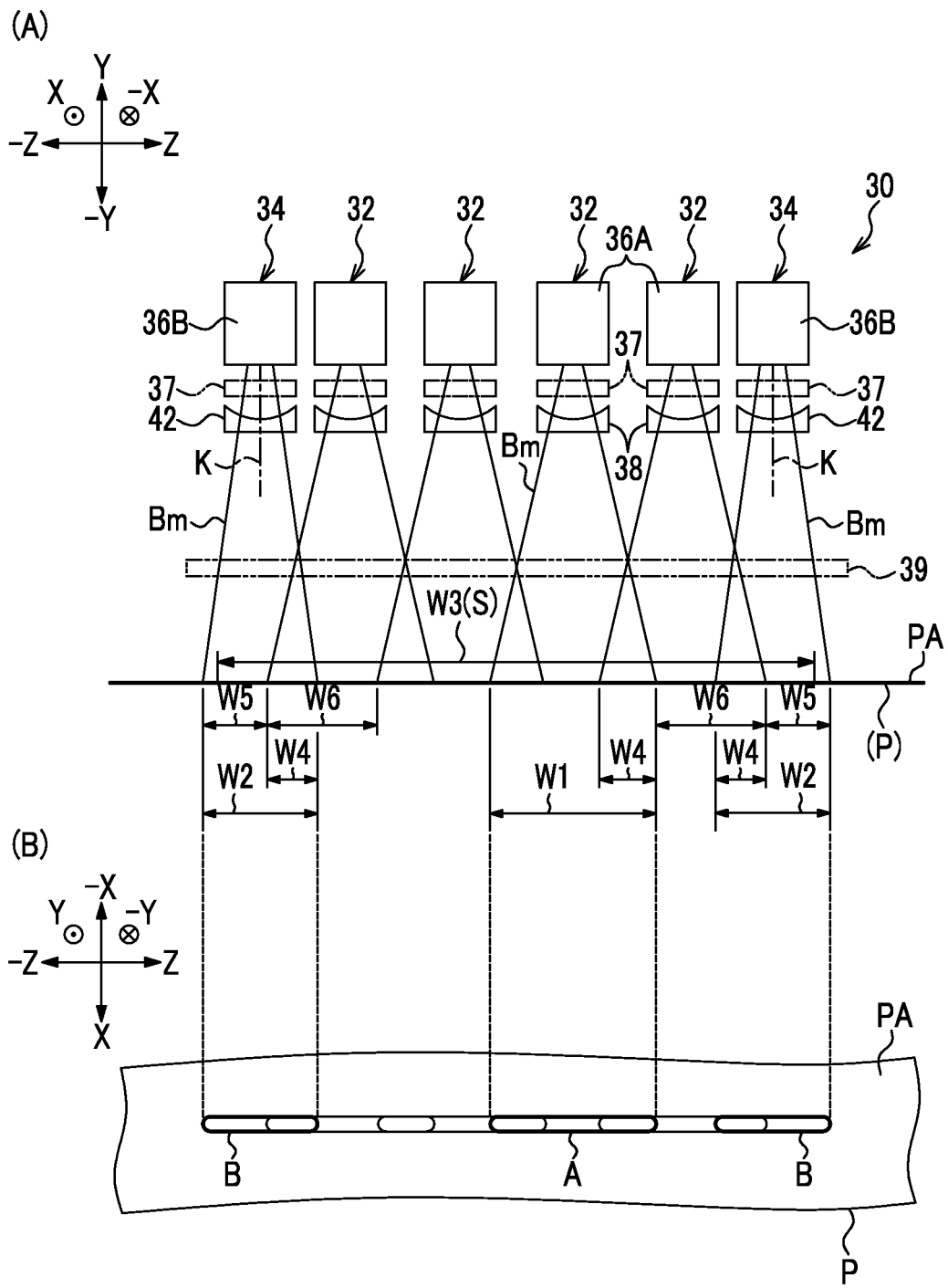
Figure 4:
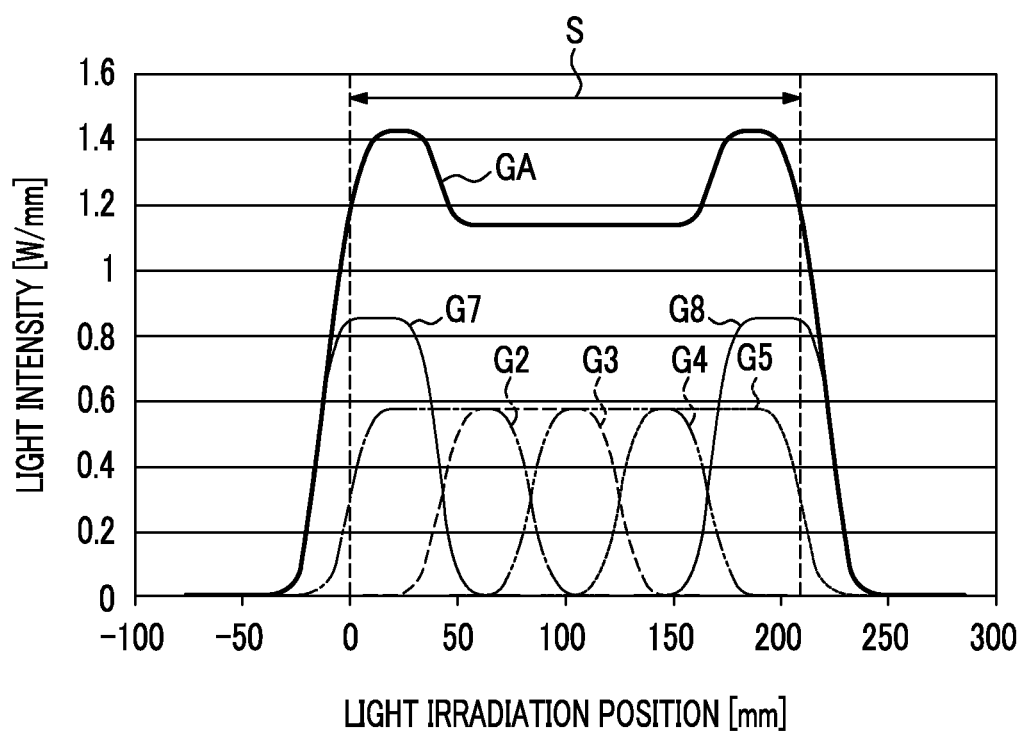
Figure 5:
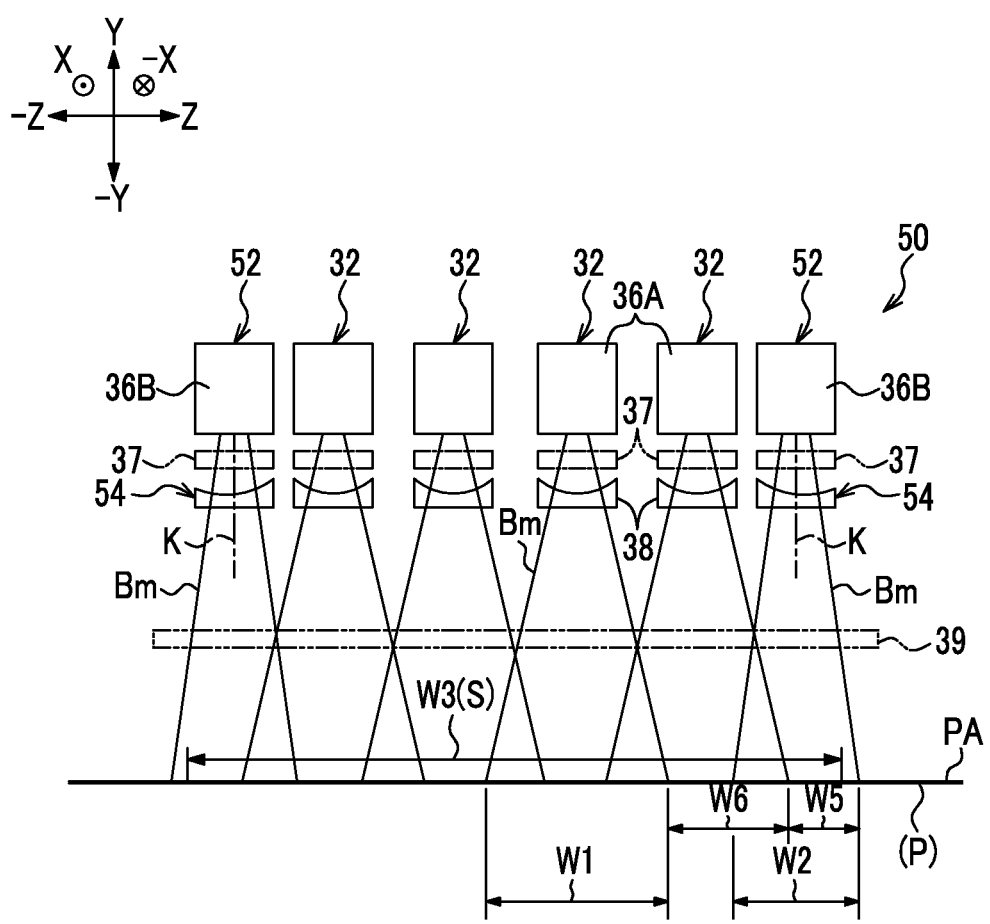
Figure 6A:
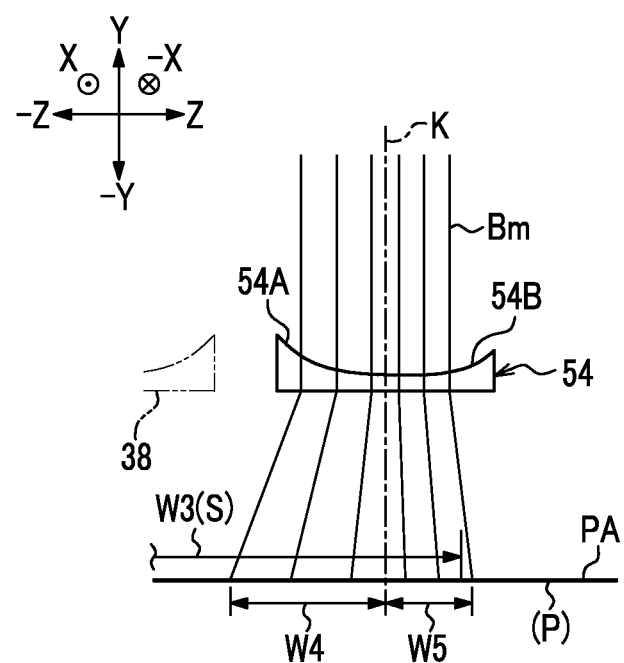
Figure 6B:
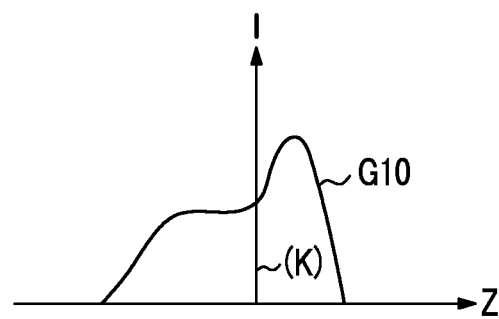
Figure 7:
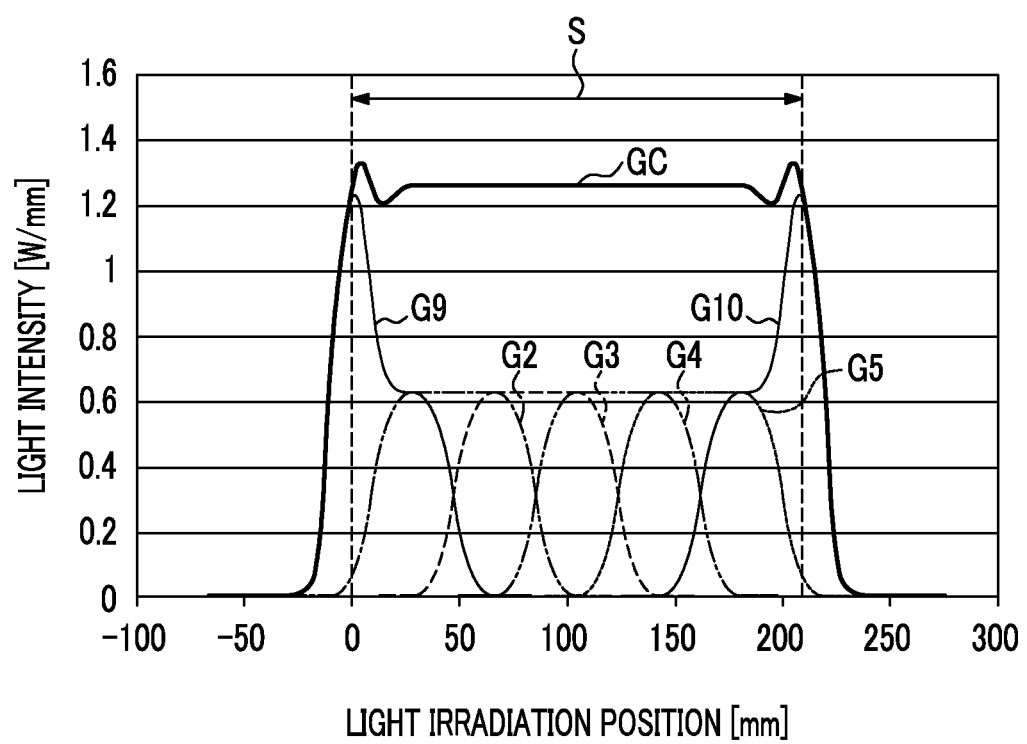
Figure 8:
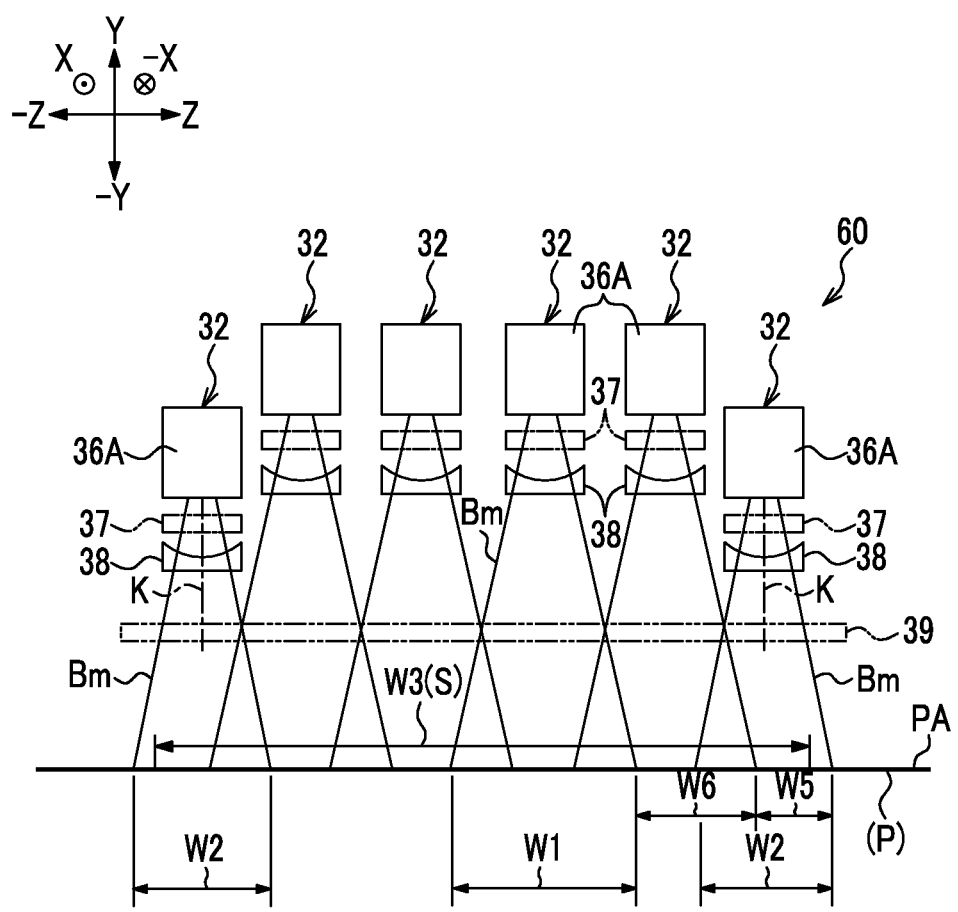
Figure 9:
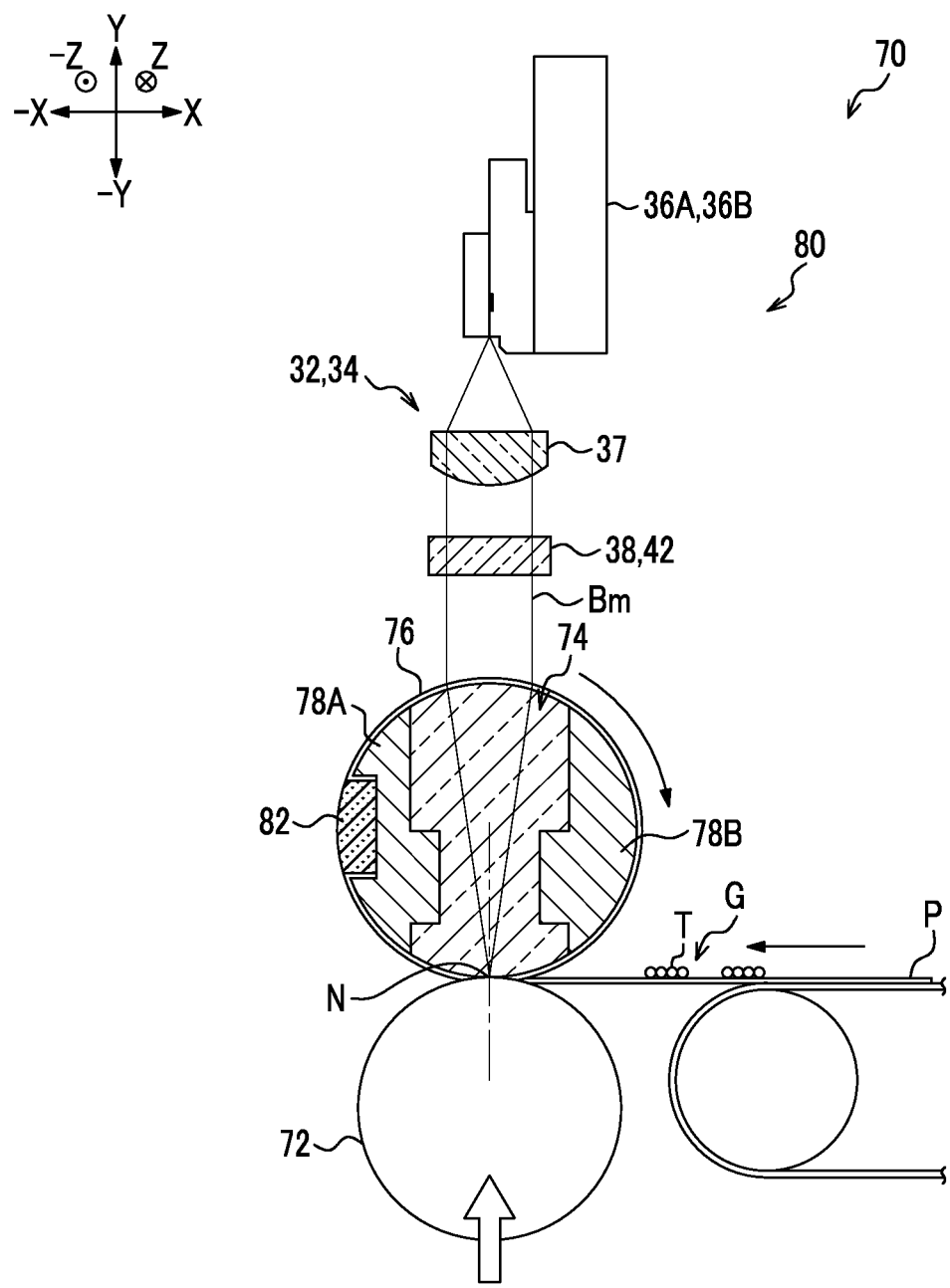
Figure 10:
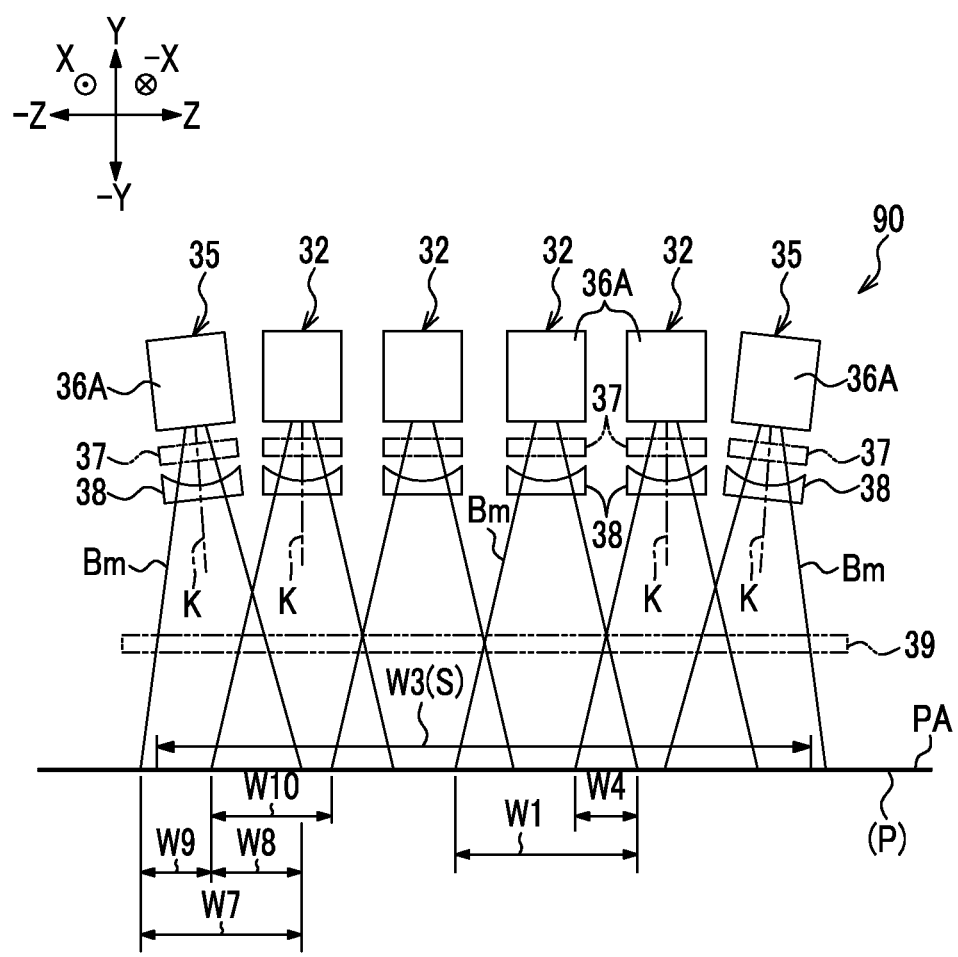
Figure 11:
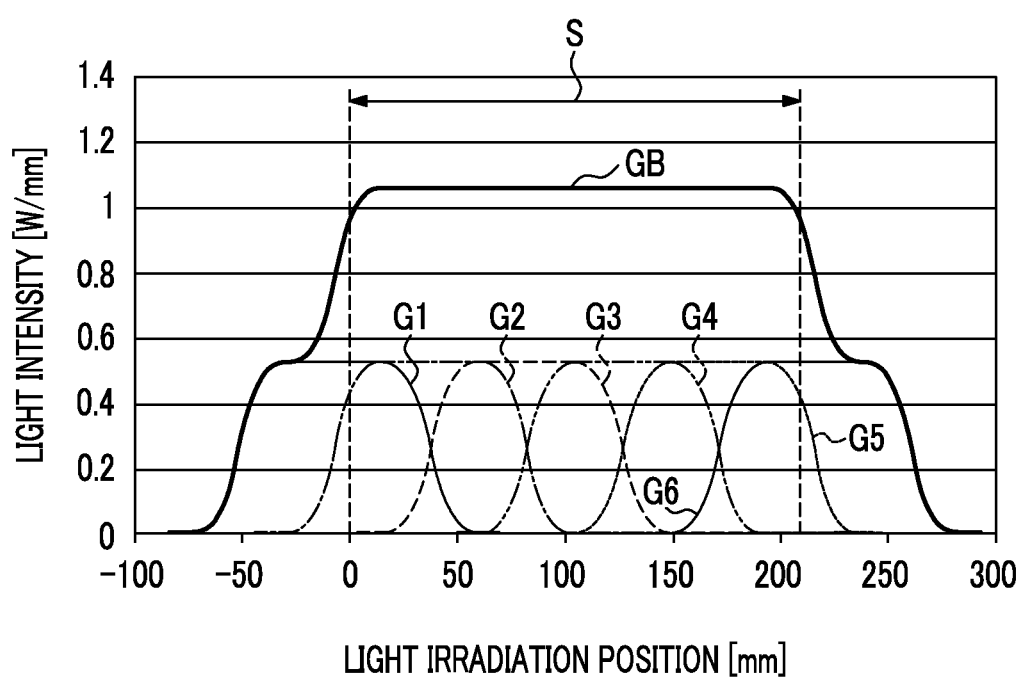

(A) of FIG. 3 is a schematic view showing an irradiation state of light caused by a light irradiation unit according to the first exemplary embodiment and (B) of FIG. 3 is a schematic view showing a state where light beams emitted by the light irradiation unit according to the first exemplary embodiment are superimposed;

FIG. 4 is a graph showing a relationship between a light irradiation position and light intensity on a surface of a sheet when the light irradiation unit according to the first exemplary embodiment is used;

FIG. 5 is a schematic view showing an irradiation state of light caused by a light irradiation unit according to a second exemplary embodiment;

FIG. 6A is a schematic view showing a diverging state of light caused by a second lens according to the second exemplary embodiment and FIG. 6B is a schematic view showing distribution of light intensity on a surface of a sheet when the second lens according to the second exemplary embodiment is used;

FIG. 7 is a graph showing a relationship between a light irradiation position and light intensity on a surface of a sheet when the light irradiation unit according to the second exemplary embodiment is used;

FIG. 8 is a schematic view showing an irradiation state of light caused by a light irradiation unit according to a third exemplary embodiment;

FIG. 9 is a configuration diagram of a fixing device according to a first modification example;

FIG. 10 is a configuration diagram of a fixing device according to a second modification example; and FIG. 11 is a graph showing a relationship between a light irradiation position and light intensity on a surface of a sheet when a light irradiation unit according to a comparative example is used.

DETAILED DESCRIPTION

First Exemplary Embodiment

Examples of a light irradiation device, a fixing device, and an image forming apparatus according to the first exemplary embodiment will be described.

Overall Configuration

Figure 1:
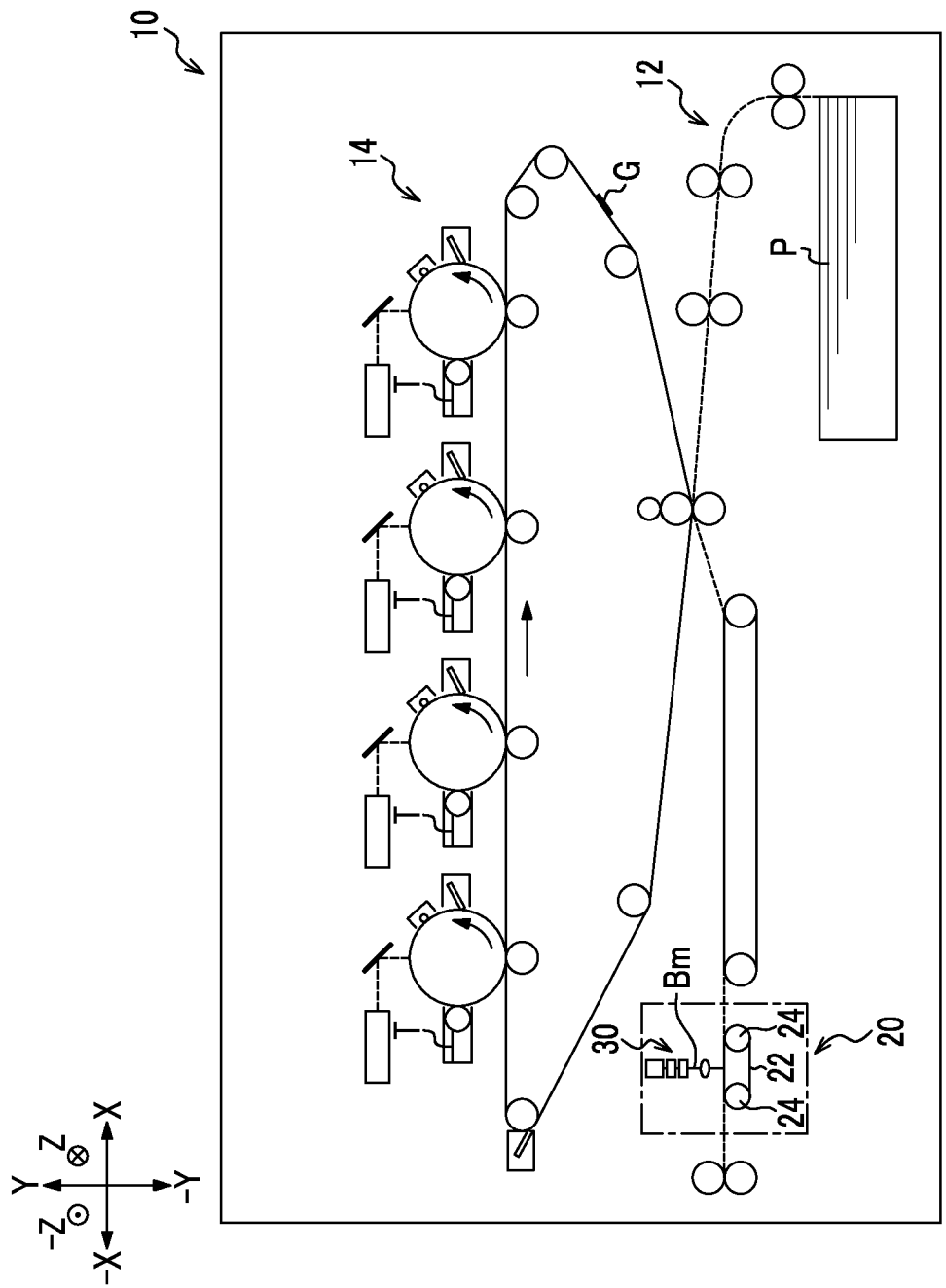
FIG. 1 is an overall configuration diagram schematically showing an image forming apparatus according to a first exemplary embodiment.

FIG. 1 shows an image forming apparatus 10 of the first exemplary embodiment. The image forming apparatus 10, for example, includes a transportation unit 12 that transports a sheet P, an image forming unit 14 that forms a toner image G on the transported sheet P using a toner T, and a fixing device 20 that fixes the toner image G onto the sheet P. The sheet P is an example of a recording medium. The toner T is an example of a developer. The toner image G is an example of a developer image. The image forming unit 14 is an example of a developer image forming unit. In addition, the image forming unit 14, for example, performs each step of charging, exposing, developing, transferring, and cleaning by an electrophotographic method.

Main Configuration

Next, the fixing device 20 will be described.

Figure 2:
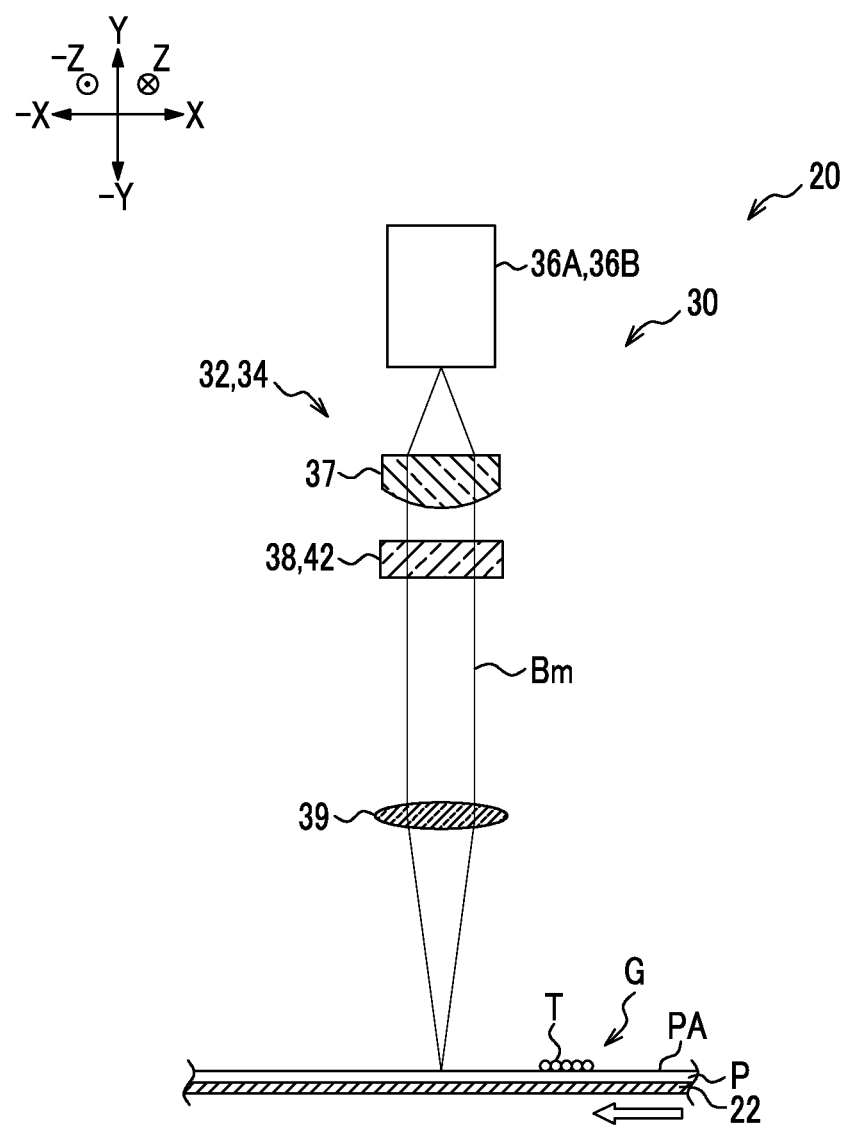
FIG. 2 is a configuration diagram of a fixing device according to the first exemplary embodiment.

As shown in FIG. 2, the fixing device 20 includes a transportation belt 22 as an example of a transportation unit that transports the sheet P to which the toner T is attached, and a light irradiation unit 30 as an example of a light irradiation device that irradiates the toner T with a laser light beam Bm as an example of light to melt the toner T.

Transportation Belt

The transportation belt 22, for example, is configured with a polyimide tubular body and is wound on two rolls 24 (see FIG. 1). One of the two rolls 24 is rotatably driven by a gear and a motor (not shown). Accordingly, the sheet P is transported by the transportation belt 22. The laser light beam Bm is emitted to a surface PA of the sheet P on the transportation belt 22. The surface PA is an example of a surface to be irradiated.

In the description hereinafter, a direction in which the sheet P is transported is set as an X direction, a direction which is orthogonal to the X direction and in which the laser light beam Bm is emitted is set as a Y direction, and a direction orthogonal to the X direction and the Y direction is set as a Z direction. The Z direction is a width direction of the sheet P. In a case where it is necessary to differentiate one side and the other side of each of the X direction, the Y direction, and the Z direction, the upper side is set as a Y side, the lower side is set as a negative Y side, the right side is set as an X side, the left side is set as a negative X side, the rear side is set as a Z side, and the front side is set as a negative Z side, when the light irradiation unit 30 is seen in the Z direction. The right side is the upstream side in the X direction and the left side is the downstream side in the X direction.

Light Irradiation Unit

Next, the light irradiation unit 30 will be described.

As shown in (A) of FIG. 3, the light irradiation unit 30, for example, includes plural first irradiation units 32 that are disposed in the Z direction at set intervals, and two second irradiation units 34 that are disposed in the Z direction with the plural first irradiation units 32 nipped therebetween. FIG. 3 shows the four first irradiation units 32, but the number of the first irradiation units 32 may be one or 4 or more.

As shown in (B) of FIG. 3, the laser light beam Bm emitted to the surface PA of the sheet P from the first irradiation units 32 (see (A) of FIG. 3) is a first light flux A in a linear line shape that is short in the X direction and long in the Z direction when seen in the Y direction. In addition, the laser light beam Bm emitted to the surface PA of the sheet P from the second irradiation units 34 (see (A) of FIG. 3) is a second light flux B in a linear line shape that is short in the X direction and long in the Z direction when seen in the Y direction. The Z direction is an example of a specific direction.

First Irradiation Unit

As shown in (A) of FIG. 3, the first irradiation unit 32 includes a laser light source 36A as an example of a first light source, and a first lens 38 that guides the laser light beam Bm from the laser light source 36A to the surface PA of the sheet P. In addition, the first irradiation unit 32 includes a collimate lens 37 and a condensing lens 39. In the first irradiation unit 32, the laser light source 36A, the collimate lens 37, a second lens 42, and the condensing lens 39 are disposed in this order according to an optical axis of the laser light beam Bm.

Laser Light Source

As shown in (A) of FIG. 3, the plural laser light sources 36A are disposed in the Z direction at set intervals on the Y side of the sheet P. In addition, the laser light source 36A emits the laser light beam Bm to the surface PA of the sheet P. In the exemplary embodiment, an optical axis direction of the laser light beam Bm is the Y direction.

Collimate Lens

The collimate lens 37 is disposed on the optical axis (not shown) of the laser light beam Bm and on the negative Y side (sheet P side) of the laser light source 36A. As shown in FIG. 2, the collimate lens 37 is, for example, a cylindrical lens, and converts the laser light beam Bm which is a diverging light beam into a parallel light beam, when seen in an X-Y plane. As shown in FIG. 3, the collimate lens 37 has the laser light beam Bm as the diverging light, when seen in a Z-Y plane.

First Lens

The first lens 38 is disposed on the optical axis of the laser light beam Bm and on the negative Y side of the collimate lens 37. In addition, the first lens 38 is, for example, a plane-concave lens, of which the Y side has a concave shape and the negative Y side has a flat shape, when seen in the X direction, and causes the laser light beam Bm to be diverged in the Z direction.

Condensing Lens

The condensing lens 39 is disposed on the optical axis of the laser light beam Bm and on the negative Y side of the first lens 38. In addition, the condensing lens 39 is commonly used by the first irradiation unit 32 and the second irradiation unit 34 (is provided as one body). As shown in FIG. 2, the condensing lens 39 condenses the laser light beam Bm in the X direction, when seen in the X-Y plane. Furthermore, the condensing lens 39 is, for example, a cylindrical lens, and condenses the laser light beam Bm in the X direction. However, as shown in FIG. 3, the condensing lens has the laser light beam Bm as the diverging light beam without being condensed, when seen in the Z-Y plane.

Herein, an irradiation width in the Z direction of the laser light beam Bm emitted to the surface PA of the sheet P by the first irradiation unit 32 is set as W1. The plural first irradiation units 32 are disposed so that a part of the laser light beam Bm (first light flux A) emitted to the surface PA of the sheet P is superimposed with a part of the laser light beam Bm (first light flux A) emitted by the adjacent first irradiation unit 32, in the Z direction.

Second Irradiation Unit

Next, the second irradiation unit 34 will be described. The members basically same as those of the first irradiation unit 32 will have the same reference numerals and description thereof will be omitted.

As shown in (A) of FIG. 3, the second irradiation unit 34 includes a laser light source 36B as an example of a second light source, and the second lens 42 that guides the laser light beam Bm from the laser light source 36B to the surface PA of the sheet P. The laser light source 36B, for example, has the same configuration as the laser light source 36A. The same configuration means to have the same optical characteristics and light irradiation performance. In addition, the second irradiation unit 34 includes the collimate lens 37 and the condensing lens 39. In the second irradiation unit 34, the laser light source 36B, the collimate lens 37, the second lens 42, and the condensing lens 39 are disposed in this order according to an optical axis of the laser light beam Bm.

Second Lens

The second lens 42 is, for example, a plane-concave lens, of which the Y side has a concave shape and the negative Y side has a flat shape, when seen in the X direction, and causes the laser light beam Bm to be diverged in the Z direction. In addition, the second lens 42 has a smaller irradiation width (range) of the surface PA of the sheet P in the Z direction which is to be irradiated with the laser light beam Bm from the laser light source 36B, compared to that of the first lens 38. That is, when the irradiation width of the surface PA of the sheet P in the Z direction to be irradiated with the laser light beam Bm by the second irradiation unit 34 is set as W2, an expression of W2<W1 is satisfied. The second lens 42 has a narrow range for the laser light beam Bm to be emitted to the surface PA of the sheet P, by setting a focal length to be longer compared to that of the first lens 38.

The two second irradiation units 34 are disposed at the outer side of the first irradiation unit 32 in the Z direction, so that a part of the laser light beam Bm (second light flux B) emitted to the surface PA of the sheet P is superimposed with a part of the laser light beam Bm (first light flux A) emitted by the adjacent first irradiation unit 32 in the Z direction. In the exemplary embodiment, both of the Z side and the negative Z side are the outer sides in the Z direction. In addition, an interval (pitch) in the Z direction between the adjacent second irradiation unit 34 and the first irradiation unit 32 is shorter than the interval in the Z direction between the first irradiation units 32. This is for causing the width of the laser light beam Bm of the second irradiation unit 34 and the laser light beam Bm of the first irradiation unit 32 superimposed in the Z direction, to be close to W4 (to match the superimposed width), by setting the width of the laser light beams Bm of the adjacent first irradiation units 32 superimposed in the Z direction as W4.

In addition, an irradiation target area (fixing area) of the laser light beam Bm on the surface PA of the sheet P is set as S. The width of the irradiation target area S in the Z direction is set as W3 (>W1). In addition, an optical axis of the laser light source 36B of the second irradiation unit 34 is set as K. Herein, the two laser light sources 36B of the second irradiation unit 34 are disposed so that two optical axes K are positioned in the irradiation target area S in the Z direction. The second irradiation unit 34 irradiates not only the irradiation target area S but also the outside of the irradiation target area S in the Z direction with the laser light beam Bm.

In addition, among the irradiation width of the surface PA irradiated with the laser light beam Bm from the second irradiation unit 34 in the Z direction, a first irradiation width that is not superimposed with the laser light beam Bm from the adjacent first irradiation unit 32 is set as W5. Among the irradiation width of the surface PA irradiated with the laser light beam Bm in the Z direction from the first irradiation unit 32 adjacent to the second irradiation unit 34, a second irradiation width that is not superimposed with the laser light beam Bm from the other first irradiation unit 32 adjacent to the first irradiation unit 32 is set as W6. Herein, an expression of W5<W6 is satisfied.

Comparative Example

A unit in which the two second irradiation units 34 of the exemplary embodiment are replaced with the two first irradiation units 32 (all configured with the first irradiation units 32) is set as a light irradiation unit of a comparative example. In addition, in the light irradiation unit of the comparative example, six first irradiation units 32 are disposed at regular intervals in the Z direction. Herein, FIG. 11 shows a simulation result of the light intensity [W/mm] with respect to the irradiation position [mm] of the laser light beam Bm of the light irradiation unit of the comparative example.

Trapezoidal graphs G1, G2, G3, G4, G5, and G6 of FIG. 11 show light intensity distribution of six first irradiation units 32 (see FIG. 3). In addition, a graph GB shown with a bold line of FIG. 11 shows the total six light intensities of the graphs G1, G2, G3, G4, G5, and G6. Herein, in order to obtain the necessary light intensity from the center and both ends of the irradiation target area S in the Z direction using the light irradiation unit of the comparative example, it is necessary to dispose the first irradiation units 32 at both ends so that the light intensity becomes maximum in the positions corresponding to both ends (boundary) of the irradiation target area S.

However, in the light irradiation unit of the comparative example, the first irradiation unit 32 having the irradiation width W1 (see FIG. 3) that is the same as that of the center portion is used on both ends in an arrangement direction. Accordingly, in the light irradiation unit of the comparative example, when the first irradiation unit 32 is disposed so that the light intensity becomes to be the maximum in the positions corresponding to both ends of the irradiation target area S, the laser light beam Bm, the area of which is more than half of the irradiation width in the graphs G1 and G6 is emitted to the outside of the irradiation target area S. Accordingly, in the light irradiation unit of the comparative example, a loss of light energy at the outside of the irradiation target area S is increased.

Operation

An operation of the first exemplary embodiment will be described.

FIG. 4 shows a simulation result of the light intensity [W/mm] with respect to the irradiation position [mm] of the laser light beam Bm of the light irradiation unit 30 of the exemplary embodiment (see FIG. 3).

Trapezoidal graphs G2, G3, G4, and G5 of FIG. 4 show light intensity distribution of the four first irradiation units 32 (see FIG. 3). In addition, trapezoidal graphs G7 and G8 of FIG. 4 show light intensity distribution of the two second irradiation units 34 (see FIG. 3). Further, a graph GA shown with a bold line of FIG. 4 shows the total six light intensities of the graphs G2, G3, G4, G5, G7, and G8.

In order to obtain the necessary light intensity from the center and both ends of the surface PA of the sheet P in the Z direction using the light irradiation unit 30 of the exemplary embodiment shown in FIG. 3, it is necessary to dispose a portion of the second irradiation unit 34 having the highest light intensity on both ends of the irradiation target area S of the laser light Bm. This is because the light intensity is insufficient only by the first irradiation units 32.

Herein, in the light irradiation unit 30, the first irradiation width W5 is smaller than the second irradiation width W6. The second irradiation units 34 having a irradiation width smaller than the first irradiation units 32 disposed in the center portion in the Z direction are disposed at both end portions in the Z direction. Accordingly, in the light irradiation unit 30, even when the second irradiation units 34 are disposed so that a portion having the highest light intensity is positioned at both ends of the irradiation target area S, a quantity of light (integration value) of the laser light beam Bm emitted to the outside of the irradiation target area S becomes (is decreased) to be smaller than a quantity of light (integration value) of the comparative example. Accordingly, in the light irradiation unit 30, a loss of light energy at the outside of the irradiation target area S is decreased, compared to the light irradiation unit of the comparative example.

In the light irradiation unit 30, the number of members configuring the first irradiation unit 32 and the number of members configuring the second irradiation unit 34 are the same as each other. That is, no members are added to the second irradiation unit 34 of the light irradiation unit 30, when compared with the first irradiation unit 32. Accordingly, the light irradiation unit 30 has a small number of components, compared to a configuration of reflecting the laser light beam Bm that is supposed to be emitted to the outside of the irradiation target area S to the inside of the irradiation target area S by adding a mirror.

In addition, the second irradiation unit 34 of the light irradiation unit 30 uses the laser light source 36B having the same configuration as that of the laser light source 36A and uses the second lens 42 having a different focal length from that of the first lens 38 of the first irradiation unit 32 to have a smaller (narrower) irradiation width. Accordingly, since the configurations of the light sources of the first irradiation unit 32 and the second irradiation unit 34 are the same, the assembly of the light irradiation unit 30 is easy, compared to a configuration of not using the light source having the same configuration as that of the laser light source 36A as the light source of the second irradiation unit 34.

In the fixing device 20 shown in FIG. 2, the light irradiation unit 30 irradiates the toner T on the sheet P transported by the transportation belt 22 with the laser light beam Bm. The toner T (toner image G) is heated and melted by absorbing the laser light beam Bm, and is fixed onto the sheet P. Herein, in the fixing device 20, the loss of light energy of the light irradiation unit 30 is decreased, compared to that of the light irradiation unit of the comparative example, and accordingly, the energy necessary for the fixation of the toner T is reduced compared to the case of the comparative example.

In the image forming apparatus 10 shown in FIG. 1, the image forming unit 14 forms the toner image G on the sheet P and the fixing device 20 fixes the toner image G onto the sheet P. Here, in the image forming apparatus 10, since the energy necessary for the fixation of the toner T is reduced by using the fixing device 20, the energy necessary for the image forming onto the sheet P is reduced, compared to the case of using the fixing device including the light irradiation unit of the comparative example.

Second Exemplary Embodiment

Next, examples of a light irradiation device, a fixing device, and an image forming apparatus according to the second exemplary embodiment will be described. The members and parts basically same as those of the first exemplary embodiment will have the same reference numerals as those of the first exemplary embodiment and description thereof will be omitted.

FIG. 5 shows a light irradiation unit 50 as an example of a light irradiation device of the second exemplary embodiment. In the second exemplary embodiment, a point of providing the light irradiation unit 50 instead of the light irradiation unit 30 (see FIG. 1) in the image forming apparatus 10 and the fixing device 20 of the first exemplary embodiment is different from the first exemplary embodiment, and the other configurations thereof are same as those of the first exemplary embodiment.

The light irradiation unit 50 includes the plural first irradiation units 32 that are disposed in the Z direction at intervals, and two second irradiation units 52 that are disposed in the Z direction with the plural first irradiation units 32 nipped therebetween. FIG. 5 shows, for example, the four first irradiation units 32, but the number of the first irradiation units 32 may be other than four.

The second irradiation unit 52 includes the laser light source 36B, and a second lens 54 that guides the laser light beam Bm from the laser light source 36B to the surface PA of the sheet P. In addition, the second irradiation unit 52 includes the collimate lens 37 and the condensing lens 39. In the second irradiation unit 52, the laser light source 36B, the collimate lens 37, the second lens 54, and the condensing lens 39 are disposed in this order according to an optical axis of the laser light beam Bm.

Second Lens

As shown in FIG. 6A, the second lens 54 is, for example, a plane-concave lens which includes a first concave surface 54A and a second concave surface 54B on the Y side which is the side of the laser light source 36B (see FIG. 5) and of which the negative Y side has a flat shape. An optical axis K of the laser light beam Bm is positioned in the center of the second lens 54 in the Z direction. FIG. 6A shows the second lens 54 positioned in end portion of the Z side. Herein, the second lenses 54 on the Z side and the negative Z side have the same configuration and are disposed to be symmetrical with each other using the center position of the irradiation target area S as the center, and accordingly the second lens 54 on the Z side will be described and the second lens 54 on the negative Z side will be omitted.

The first concave surface 54A is disposed on the negative Z side which is the first lens 38 side with respect to the optical axis K, using the optical axis K as a boundary, when the second lens 54 is seen in the X direction. The second concave surface 54B is disposed on the Z side with respect to the optical axis K, when the second lens 54 is seen in the X direction. The first concave surface 54A and the second concave surface 54B are connected to each other in the Z direction. A curvature of the first concave surface 54A is greater than a curvature of the second concave surface 54B.

The curvature and a focal length of the first concave surface 54A are set so that the irradiation width W4 on the surface PA of the sheet P is irradiated with the laser light beam Bm incident to the first concave surface 54A, from the optical axis K to the negative Z side. The curvature and a focal length of the second concave surface 54B are set so that the first irradiation width W5 (<W4) on the surface PA of the sheet P is irradiated with the laser light beam Bm incident to the second concave surface 54B, from the optical axis K to the Z side. For example, the sum of the irradiation width W4 and the first irradiation width W5 is substantially equivalent to the irradiation width W2 (see FIG. 3).

As shown in FIG. 6B, in a case where the second lens 54 is used, distribution of the light intensity I with respect to the light irradiation position (Z direction position) has a left-right asymmetric shape with the optical axis K as the center, as shown in a graph G10. Specifically, the laser light beam Bm penetrating the first concave surface 54A (see FIG. 6A) is diverged to the negative Z side. In addition, the laser light beam Bm penetrating the second concave surface 54B (see FIG. 6A) is diverged to the Z side to have a smaller width, compared to the laser light beam Bm penetrating the first concave surface 54A. The graph of the light intensity I of the laser light beam Bm diverged by the second concave surface 54B has the smaller width in the Z direction and a larger maximum value (peak), compared to a graph of the light intensity I of the laser light beam Bm penetrating the first concave surface 54A (see FIG. 6A).

As shown in FIG. 5, the two second irradiation units 52 are disposed so that a part of the laser light beam Bm emitted to the surface PA of the sheet P is superimposed with a part of the laser light beam Bm emitted by the adjacent first irradiation unit 32. In addition, the two laser light sources 36B of the second irradiation unit 52 are disposed so that two optical axes K are positioned in the irradiation target area S in the Z direction. The second irradiation unit 52 irradiates not only the irradiation target area S but also the outside of the irradiation target area S in the Z direction with the laser light beam Bm.

In addition, from the irradiation width of the surface PA irradiated with the laser light beam Bm from the second irradiation unit 52 in the Z direction, a first irradiation width that is not superimposed with the laser light beam Bm from the adjacent first irradiation unit 32 is set as W5. From the irradiation width of the surface PA irradiated with the laser light beam Bm in the Z direction from the first irradiation unit 32 adjacent to the second irradiation unit 34, a second irradiation width that is not superimposed with the laser light beam Bm from the other first irradiation unit 32 adjacent to the first irradiation unit 32 is set as W6. Herein, an expression of W5<W6 is satisfied.

Operation

An operation of the second exemplary embodiment will be described.

FIG. 7 shows a simulation result of the light intensity [W/mm] with respect to the irradiation position [mm] of the laser light beam Bm of the light irradiation unit 50 of the exemplary embodiment (see FIG. 5).

As described above, trapezoidal graphs G2, G3, G4, and G5 of FIG. 7 show light intensity distribution of the four first irradiation units 32 (see FIG. 5). In addition, graphs G9 and G10 of FIG. 7 show light intensity distribution of the two second irradiation units 52 (see FIG. 5). Further, a graph GC shown with a bold line of FIG. 7 shows the total six light intensities of the graphs G2, G3, G4, G5, G9, and G10.

In order to obtain the necessary light intensity from the center and both ends of the surface PA of the sheet P in the Z direction using the light irradiation unit 50 of the exemplary embodiment shown in FIG. 5, it is necessary to dispose a portion of the second irradiation unit 52 having the highest light intensity on both ends of the irradiation target area S of the laser light Bm. This is because the light intensity is insufficient only by the first irradiation units 32.

Herein, in the light irradiation unit 50, the second irradiation units 52 having a irradiation width smaller than the first irradiation units 32 disposed in the center portion in the Z direction are disposed at both end portions in the Z direction. Accordingly, in the light irradiation unit 50, even when the second irradiation units 52 are disposed so that a portion having the highest light intensity is positioned at both ends of the irradiation target area S, a quantity of light (integration value) of the laser light beam Bm emitted to the outside of the irradiation target area S becomes (is decreased) to be smaller than a quantity of light (integration value) of the comparative example (see FIG. 11). Accordingly, in the light irradiation unit 50, a loss of light energy at the outside of the irradiation target area S is decreased, compared to the light irradiation unit of the comparative example.

In addition, the second irradiation unit 52 of the light irradiation unit 50 uses the laser light source 36B having the same configuration as that of the laser light source 36A and uses the second lens 54 having a different focal length from that of the first lens 38 of the first irradiation unit 32 to have a smaller (narrower) irradiation width. Accordingly, since the configurations of the light sources of the first irradiation unit 32 and the second irradiation unit 52 are common, the assembly of the light irradiation unit 50 is easy, compared to a configuration of not using the light source having the same configuration as that of the laser light source 36A as the light source of the second irradiation unit 52.

As shown in FIG. 6A, in the light irradiation unit 50, the second concave surface 54B having a small curvature and a long focal length is positioned at the outer side in the Z direction (the side opposite to the first lens 38 side) with respect to the first concave surface 54A having a large curvature and a short focal length. Accordingly, the light intensity of the laser light beam Bm emitted to the surface PA of the sheet P by the second lens 54 on the first lens 38 side is low, and the light intensity thereof on the boundary portion of the irradiation target area S is high. The sum of the light intensity of the laser light beam Bm penetrating the first lens 38 and the light intensity of the laser light beam Bm penetrating the first concave surface 54A of the second lens 54 is close to the light intensity of the laser light beam Bm penetrating the second concave surface 54B of the second lens 54. Therefore, as shown in FIG. 7, a difference between the light intensity on end portion in the irradiation target area S in the Z direction and the light intensity in the center thereof in Z direction is decreased.

In the fixing device 20 including the light irradiation unit 50, the light irradiation unit 50 irradiates the toner T on the sheet P transported by the transportation belt 22 with the laser light beam Bm. The toner T (toner image G) is heated and melted by absorbing the laser light beam Bm, and is fixed onto the sheet P. Herein, in the fixing device 20, the loss of light energy of the light irradiation unit 50 is decreased, compared to that of the light irradiation unit of the comparative example, and accordingly, the energy necessary for the fixation of the toner T is reduced compared to the case of the comparative example.

In the image forming apparatus 10, the image forming unit 14 forms the toner image G on the sheet P and the fixing device 20 fixes the toner image G onto the sheet P. Here, in the image forming apparatus 10, since the energy necessary for the fixation of the toner T is reduced by using the fixing device 20, the energy necessary for the image forming onto the sheet P is reduced, compared to the case of using the fixing device including the light irradiation unit of the comparative example.

Third Exemplary Embodiment

Next, examples of a light irradiation device, a fixing device, and an image forming apparatus according to the third exemplary embodiment will be described. The members and parts basically same as those of the first exemplary embodiment will have the same reference numerals as those of the first exemplary embodiment and description thereof will be omitted.

FIG. 8 shows a light irradiation unit 60 as an example of a light irradiation device of the third exemplary embodiment. In the third exemplary embodiment, a point of providing the light irradiation unit 60 instead of the light irradiation unit 30 (see FIG. 1) in the image forming apparatus 10 and the fixing device 20 of the first exemplary embodiment is different from the first exemplary embodiment, and the other configurations thereof are same as those of the first exemplary embodiment.

In the light irradiation unit 60, for example, the six first irradiation units 32 are disposed at set intervals in the Z direction. The light irradiation unit 60 does not include the second irradiation units 34 (see FIG. 3). In the light irradiation unit 60, the two first irradiation units 32 at both ends in the Z direction are disposed in a position close to the surface PA of the sheet P, compared to the other four first irradiation units 32. That is, the four first irradiation units 32 in the center in the Z direction are disposed in the position to have the irradiation width W1 on the surface PA, and the two first irradiation units 32 at both ends in the Z direction are disposed in the position to have the irradiation width W2 on the surface PA. In addition, the two laser light sources 36A at both ends in the Z direction are disposed so that two optical axes K are positioned in the irradiation target area S in the Z direction. The second irradiation unit 34 irradiates not only the irradiation target area S but also the outside of the irradiation target area S in the Z direction with the laser light beam Bm.

In addition, from the irradiation width of the surface PA irradiated with the laser light beam Bm from the first irradiation units 32 at both ends in the Z direction, a first irradiation width that is not superimposed with the laser light beam Bm from the adjacent first irradiation unit 32 is set as W5. From the irradiation width of the surface PA irradiated with the laser light beam. Bm in the Z direction from the first irradiation unit 32 adjacent to the first irradiation units 32 at both ends in the Z direction, a second irradiation width that is not superimposed with the laser light beam Bm from the other first irradiation unit 32 adjacent to the first irradiation unit 32 is set as W6. Herein, an expression of W5<W6 is satisfied.

Operation

An operation of the third exemplary embodiment will be described.

In the light irradiation unit 60 shown in FIG. 8, the irradiation widths at both ends in the Z direction are smaller than those in the center portion. Accordingly, in the light irradiation unit 60, even when the first irradiation units 32 are disposed so that a portion having the highest light intensity is positioned at both ends of the irradiation target area S, a quantity of light (integration value) of the laser light beam Bm emitted to the outside of the irradiation target area S is decreased to be smaller than a quantity of light (integration value) of the comparative example. Therefore, in the light irradiation unit 60, a loss of light energy at the outside of the irradiation target area S is decreased, compared to the light irradiation unit of the comparative example.

In the light irradiation unit 60, the first irradiation units 32 at both ends in the Z direction among the plural first irradiation units 32 are close to the surface PA of the sheet P. Accordingly, it is not necessary to use the irradiation unit having the different configuration, and therefore, the first irradiation unit and the second irradiation unit are configured with the same elements. The operations of the fixing device 20 and the image forming apparatus 10 are the same as those in the first exemplary embodiment, and therefore the description thereof will be omitted.

The invention is not limited to the exemplary embodiments described above. For example, the following modification examples may be employed.

First Modification Example

A fixing device is not limited to a device that performs fixation of the toner T in a non-contact manner as the fixing device 20 shown in FIG. 2, and may be a device that performs fixation of the toner T in a contact manner as a fixing device 70 shown in FIG. 9.

The fixing device 70 includes an opposite roll 72 as an example of the transportation unit and a light irradiation unit 80 as an example of the light irradiation device. The opposite roll 72 is rotatably provided using the Z direction as an axial direction.

In the light irradiation unit 80, a lens pad 74 and a transparent tube 76 having the Z direction as a longitudinal direction are provided instead of the condensing lens 39 (see FIG. 3) in the first irradiation unit 32 and the second irradiation unit 34 of the first exemplary embodiment. The lens pad 74 is nipped and supported between a support frame 78A and a support frame 78B. The transparent tube 76 is rotatably disposed on the outer side of the lens pad 74, the support frame 78A, and the support frame 78B.

The transparency of the transparent tube 76 means sufficiently high transmittance in a wavelength region of the laser light beam Bm. That is, the transparent tube 76 may be any component as long as it transmits the laser light beam Bm, and the higher transmittance as much as possible is preferable, in order to realize efficiency for light utilization and to prevent the heating of the lens pad 74. The transmittance is, for example equal to or greater than 90 [%] and desirably equal to or greater than 95 [%].

As the material of the lens pad 74, a material having heat resistance may be generally selected from the materials used for the lens, and an optical transparent plastic resin is used, for example. Examples of the optical transparent plastic resin include materials including polydiethylene glycol bisallyl carbonate (PADC), polymethyl methacrylate (PMMA), and polystyrene (PSt). In addition, examples of the optical transparent plastic resin include materials including a polymer formed of a methyl methacrylate unit and a styrene unit (MS resin), a polycarbonate resin, a cycloolefin resin, and a fluorene resin, for example.

The laser light beam Bm penetrating the first lens 38 or the second lens 42 is incident to the Y side of the transparent tube 76. The laser light beam Bm penetrating the lens pad 74 and the transparent tube 76 is output from the negative Y side of the transparent tube 76. In addition, silicone oil permeated in a felt material 82 is, for example, applied to the inner surface of the transparent tube 76. Further, the outer circumferential surface of the transparent tube 76 and the outer circumferential surface of the opposite roll 72 come into contact with each other, to form a nip portion N that pressurizes the toner T.

The lens pad 74 causes the laser light beam Bm emitted by penetrating the transparent tube 76 to be converged in the X direction and concentrates the laser light beam on the nip portion N. The lens pad 74 supports the transparent tube 76 passing the nip portion N from the inside. As described above, the fixing device 70 may pressurize the toner T by bringing the transparent tube 76 into contact with the toner T, irradiates the toner T with the light by the light irradiation unit 80 to heat and melt the toner. The laser light beam Bm is diverged in the Z direction by the first lens 38 and the second lens 42.

Second Modification Example

A method of changing the irradiation width and the light intensity distribution of the laser light beam Bm on the surface PA of the sheet P is not limited to the method using the first lens 38, and the second lenses 42 and 54. For example, a light irradiation unit 90 of a second modification example shown in FIG. 10 may be used.

The light irradiation unit 90 has a configuration of replacing the second irradiation units 34 at both ends in the Z direction (see FIG. 3) in the light irradiation unit 30 of the first exemplary embodiment (see FIG. 3) with second irradiation units 35. The second irradiation unit 35 is configured with the same member as that of the first irradiation unit 32, but is different in a point that the second irradiation unit is inclined so that the laser light beam Bm (optical axis K) emitted to the surface PA of the sheet P from the second irradiation unit 35 faces the first irradiation unit 32 side.

When the irradiation width of the surface PA of the sheet P in the Z direction to be irradiated with the laser light beam Bm by the second irradiation unit 35 is set as W7, an expression of W7<W1 is satisfied. In addition, when the width where the laser light beam Bm of the second irradiation unit 35 and the laser light beam Bm of the first irradiation unit 32 are superimposed in the Z direction is set as W8, an expression of W8>W4 is satisfied.

In addition, from the irradiation width of the surface PA irradiated with the laser light beam Bm from the second irradiation unit 35 in the Z direction, a first irradiation width that is not superimposed with the laser light beam Bm from the adjacent first irradiation unit 32 is set as W9. Further, from the irradiation width of the surface PA irradiated with the laser light beam Bm in the Z direction from the first irradiation unit 32 adjacent to the second irradiation unit 35, when a second irradiation width that is not superimposed with the laser light beam Bm from the other adjacent first irradiation unit 32 is set as W10, an expression of W9<W10 is satisfied.

Herein, in the light irradiation unit 90, a quantity of light (integration value) of the laser light beam Bm emitted to the outside of the irradiation target area S becomes (is decreased) to be smaller than a quantity of light (integration value) of the comparative example (see FIG. 11). Accordingly, in the light irradiation unit 90, the quantity of light emitted to the outside of the irradiation target area S on the surface PA is decreased and a loss of light energy at the outside of the irradiation target area S is decreased, compared to the light irradiation unit of the comparative example.

Other Modification Example

The light irradiation units 30, 50, 60, and 80 are not limited to be used in the fixing devices 20 and 70, and may be used in a heat treatment device that performs annealing for removing processing strain. In addition, the light irradiation units 30, 50, 60, and 80 may be used as an inline sensor that performs the image forming on the sheet P, emits light to the toner image G, receives the reflected light from the toner image G, and evaluates the toner image G. Further, the light irradiation units 30, 50, 60, and 80 may be used as a light irradiation unit of a scanner.

The first lens 38 and the second lenses 42 and 54 are not limited to be configured with a diffusion optical system (concave lens), and may be configured with a condensing optical system (convex lens). When the first lens 38 and the second lenses 42 and 54 are configured with a condensing optical system, the first lens 38 and the second lenses 42 and 54 may be disposed so that the condensed divergent light is emitted to the surface of the sheet P.

Regarding the light source, the first irradiation unit and the second irradiation unit are not limited to have the same configuration, as the laser light sources 36A and 36B. As long as they are configured to have the same melting state of the toner T, the laser light source having the different configurations between the first irradiation unit and the second irradiation unit may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light irradiation device comprising:
   a plurality of first irradiation units that irradiate an irradiation target area on a surface to be irradiated with light beams and are disposed in a specific direction; and
   a plurality of second irradiation units that irradiate an outside of the irradiation target area with light beams and are disposed at an outer side of the first irradiation units in the specific direction,
   wherein light beams emitted from two adjacent irradiation units among the plurality of first irradiation units and the plurality of second irradiation units are superimposed with each other in the specific direction, and
   a first irradiation width that is not superimposed with the light beam from the adjacent first irradiation unit among irradiation width of the surface to be irradiated that is irradiated with the light beam from the second irradiation unit in the specific direction is smaller than a second irradiation width that is not superimposed with the light beam from the other adjacent first irradiation unit among the irradiation width of the surface to be irradiated that is irradiated with the light beam from the adjacent first irradiation unit in the specific direction.

2. The light irradiation device according to claim 1, wherein the irradiation width of the surface to be irradiated that is irradiated with the light beam from the second irradiation unit in the specific direction is smaller than the irradiation width of the surface to be irradiated that is irradiated with the light beam from the first irradiation unit in the specific direction.

3. The light irradiation device according to claim 2, wherein the first irradiation unit includes a first light source and a first lens that guides the light beam from the first light source to the surface to be irradiated,
   the second irradiation unit includes a second light source having a same specification as a specification of the first light source and a second lens that guides the light beam from the second light source to the surface to be irradiated, and
   the second lens makes the irradiation width in the specific direction of the light beam emitted to the surface to be irradiated from the second light source be smaller than the irradiation width in the specific direction of the light that penetrates the first lens from the first light source and is emitted to the surface to be irradiated.

4. The light irradiation device according to claim 2, wherein the second irradiation unit is positioned to be close to the surface to be irradiated, as compared to the first irradiation unit.

5. The light irradiation device according to claim 2, wherein each one of the first irradiation units includes:
   a first light source; and
   a first lens that is configured to guide a light beam from the first light source to the surface,
   wherein each one of the second irradiation units includes:
   a second light source having a same specification as a specification of the first light source; and
   a second lens that is configured to guide a light beam from the second light source to the surface, and
   wherein the second lens is configured to make an irradiation width in the first direction of the light beam emitted to the surface from the second light source be smaller than an irradiation width in the first direction of light that penetrates the first lens from the first light source and is emitted to the surface.

6. The light irradiation device according to claim 2, wherein the second irradiation units are positioned to be closer to the surface, as compared to the first irradiation units.

7. The light irradiation device according to claim 3, wherein the second lens makes the irradiation width of one side in the specific direction be smaller than the irradiation width on the other side, using an optical axis of the light beam from the second light source as a boundary.

8. The light irradiation device according to claim 3, wherein the second lens is configured to make an irradiation width of one side in the first direction be smaller than an irradiation width on another side, using an optical axis of the light beam from the second light source as a boundary.

9. The light irradiation device according to claim 1, wherein the second irradiation unit is inclined so that the light beam emitted to the surface to be irradiated from the second irradiation unit is guided to the first irradiation unit side.

10. The light irradiation device according to claim 9, wherein the second irradiation unit is positioned to be close to the surface to be irradiated, as compared to the first irradiation unit.

11. The light irradiation device according to claim 9, wherein the second irradiation units are positioned to be closer to the surface, as compared to the first irradiation units.

12. The light irradiation device according to claim 1, wherein the second irradiation unit is positioned to be close to the surface to be irradiated, as compared to the first irradiation unit.

13. A fixing device comprising:
the light irradiation device according to claim 1,
wherein the fixing device irradiates a developer on a recording medium transported by a transportation unit with a light beam, and fixes the developer onto the recording medium.

14. An image forming apparatus comprising:
a developer image forming unit that forms a developer image on a recording medium; and
the fixing device according to claim 13 that fixes the developer image onto the recording medium.

15. An image forming apparatus comprising:
a developer image forming unit configured to form a developer image on a recording medium; and
the fixing device according to claim 13 configured to fix the developer image onto the recording medium.

16. The light irradiation device according to claim 1, wherein a third irradiation width of the surface in the first direction that is irradiated with the first light beam is smaller than a fourth irradiation width of the surface in the first direction that is irradiated with the second light beam.

17. The light irradiation device according to claim 1, wherein the second irradiation unit is inclined so that the first light beam is guided to a first irradiation unit side.

18. The light irradiation device according to claim 1, wherein the second irradiation units are positioned to be closer to the surface, as compared to the first irradiation units.

19. A fixing device comprising:
the light irradiation device according to claim 1,
wherein the fixing device is configured to irradiate a developer on a recording medium transported by a transportation unit with a light beam, and to fix the developer onto the recording medium.

20. A light irradiation device comprising:
a plurality of first irradiation units configured to irradiate with light beams an irradiation target area on a surface,
wherein the plurality of first irradiation units are arranged in a first direction; and
a plurality of second irradiation units configured to irradiate with light beams outer areas of the irradiation target area,
wherein the plurality of second irradiation units are arranged at outer sides of the first irradiation units in the first direction,
wherein light beams emitted from two adjacent irradiation units, from among the plurality of first irradiation units and the plurality of second irradiation units, are superimposed with each other in the first direction,
wherein one of the second irradiation units is arranged adjacent to a first one of the first irradiation units in the first direction,
wherein a second one of the first irradiation units is arranged adjacent to the first one of the first irradiation units in the first direction,
wherein the one of the second irradiation units is configured to emit a first light beam,
wherein the first one of the first irradiation units is configured to emit a second light beam,
wherein the second one of the first irradiation units is configured to emit a third light beam, and
wherein a first irradiation width of the surface in the first direction that is irradiated with the first light beam, and is not superimposed with the second light beam, is smaller than a second irradiation width of the surface in the first direction that is irradiated with the second light beam, and is not superimposed with the third light beam.

* * * * *